Dec. 9, 1930.  A. M. WALSTROM  1,784,260

DOUBLE ACTING GREASE GUN

Filed July 27, 1929

INVENTOR
Axel M. Walstrom

Patented Dec. 9, 1930

1,784,260

UNITED STATES PATENT OFFICE

AXEL M. WALSTROM, OF MINNEAPOLIS, MINNESOTA

DOUBLE-ACTING GREASE GUN

Application filed July 27, 1929. Serial No. 381,451.

My invention relates to lubricating devices which are used to force a lubricant into the journals of machinery and automotive vehicles.

The main object of my invention is a double purpose grease gun by which the grease may be rapidly and positively expelled in continuous flow at a comparatively low pressure where there is very little resistance to overcome, but, which is also adapted to intermittently eject small charges of grease at a very high pressure where there is considerable resistance to overcome.

Another object of my invention is a small and compact double acting grease gun having very few parts and which is manually actuated to positively perform its functions without the use of the vacuum, spring or atmospheric charging pressure now usually employed in other grease guns with uncertain results.

A further object of my invention is a double acting grease gun of extremely simple construction which can be manufactured to sell at a comparatively low price.

My invention consists, mainly, in a combination of primary and secondary grease ejectors, and wherein said primary ejector consists of a telescoping grease container having screw threaded means whereby considerable leverage is obtained to expel a heavy grease therefrom in continuous flow through the compression chamber of the secondary ejector wherein a small diameter plunger is adapted to be reciprocated so that small charges of said grease may be intermittently ejected therefrom at a very high pressure.

My invention consists, further, of the several features shown and described in the following drawing, specification and claims.

Figure 1:
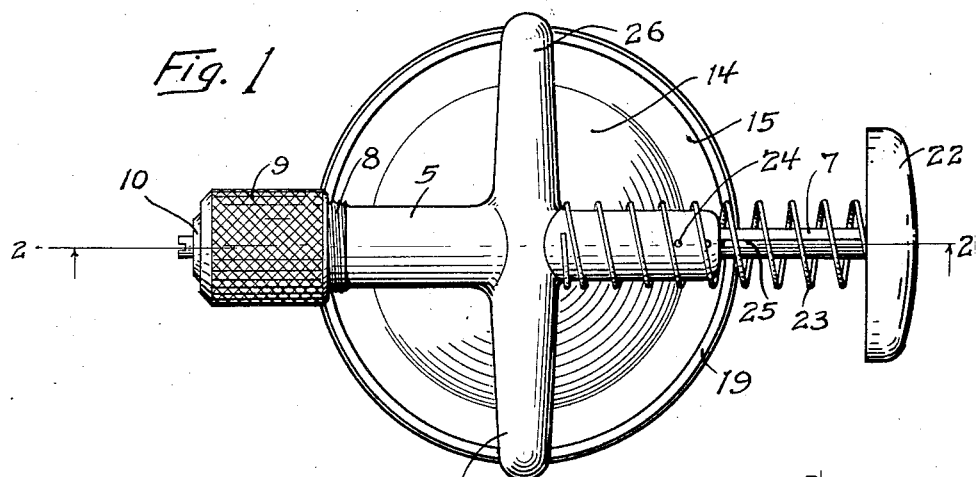
Fig. 1 is a full size plan view of a double acting grease gun embodying my invention.

In all of the views, numeral 5 indicates the barrel portion of my improved grease gun which has a central bore 6 wherein a plunger 7 is adapted to be reciprocated. The front end of this gun barrel is provided with exterior screw threads 8, whereby any suitable discharge nozzle, or other attachment, may be fitted thereto. The nozzle piece 9, which holds the resilient mouth-piece 10 in place against the pointed end 11 of the gun barrel 5, as shown, forms the subject matter of an application now pending in the United States Patent Office, and does not require further description herein.

Figure 2:
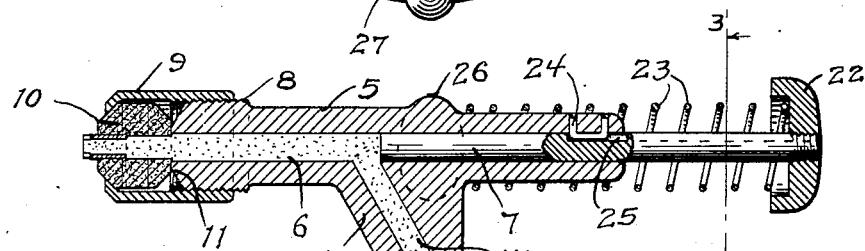
Fig. 2 is a sectional view of same, taken on line 2—2 of Fig. 1.
Figure 3:
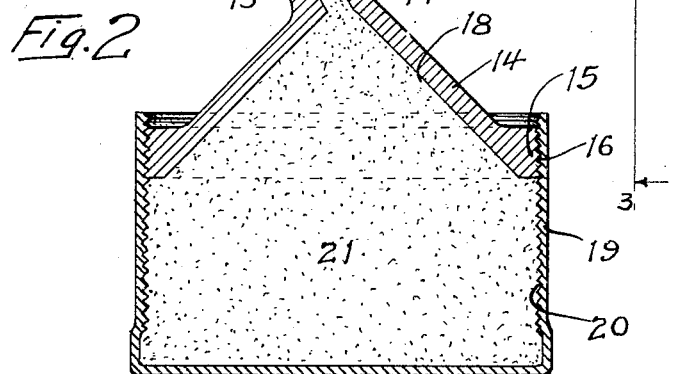
Fig. 3 is a sectional view, taken on the line 3—3 of Fig. 2, with the detachable part of the grease container removed.
Figure 3:
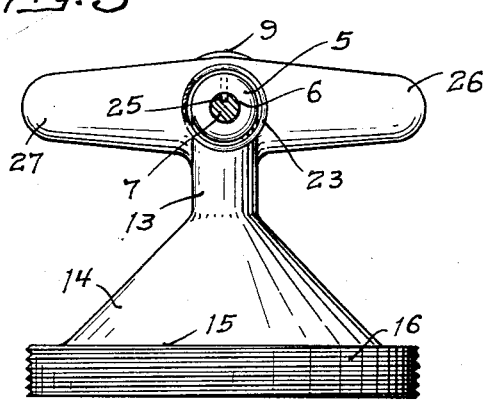

To adapt my invention for its primary purpose of rapidly filling grease cups, gear casings, wheel hubs, and other places requiring a considerable amount of lubricant, and where there is slight resistance to the entrance of grease, I provide an integral projection 13 on one side of the barrel 5, and this projection has a flared portion 14 which terminates in a circular flange 15 which is provided upon its periphery with screw threads 16. A grease duct 17 extends from the recess 18, in the flared portion 14, to a point immediately in front of the extended plunger 7 in the bore 6, as shown in Fig. 2. A cup shaped grease container 19 is provided with screw threads 20 on its inside wall which are adapted to snugly engage the screw threads 16 and thus form a screw threaded means whereby the parts 13, 14 and 15 may be forced into the cup 19 with considerable leverage so as to force the grease 21 therefrom in continuous flow through the duct 17, bore 6 and mouthpiece 10, when the cup 19 is forcibly rotated in a clock-wise direction. When emptied, this comparatively large cup is easily detached and refilled, as compared to the elongated small diameter containers with which the common type of grease gun is now equipped and which must be carefully vented during the filling operation to prevent air pockets which seriously interfere with the re-charging functions when a vacuum and atmospheric pressure system is employed.

To adapt my invention for its secondary purpose of injecting small portions of grease into tight fitting bearings and obstructed grease ducts where the resistance to the entrance of grease is considerable, I provide the small diameter plunger 7 whereby intermittent charges of grease may be forced from the bore 6 with enormous pressure. This plunger is manually actuated by a thrust on a push-button 22 which is mounted on the projecting rear end of said plunger where a compression spring 23 is provided to return said plunger and push-button to a point where the inner end of the plunger exposes the duct 17. A stop pin 24, in the rear end of the bore 6, serves to limit the rearward movement of the plunger by engaging the inner end of a groove 25 in said plunger.

To obtain increased pressure on said plunger, in cases where clogged grease ducts offer especially stubborn resistance, I provide lugs 26 and 27 which project on opposite sides of the central portion of the barrel 5, and which may be readily grasped by the fingers of the same hand by which the push-button 22 is pressed. A simultaneous pull on these lugs by the fingers while the push-button is being pressed by the palm of the hand, will greatly augment the pressure on the plunger and will also make the gun operative where the gun nozzle can not be placed against a firm contact in opposition to the thrust thereon, as, when a flexible hose attachment is used on the front end of the gun.

The operation and advantages of my improved double acting grease gun will be apparent from the foregoing description, and will be further emphasized by a comparison with the patented devices which may be cited as references in the forthcoming official actions on this application.

As my invention provides a simpler, more positive and less troublesome device, which serves two distinct purposes, and yet can be sold for less than the single purpose grease guns now in general use, I believe I have, in fact, invented a new and useful improvement in grease guns, and I therefore respectfully beg an early allowance of the following claims thereon:

I claim:

1. A grease gun, comprising: a barrel having a bore and a plunger adapted to be reciprocated therein, an integral projection of comparatively small cross-sectional area extending a considerable distance on one side of said barrel and having a flared end portion terminating in a circular flange which is provided with a screw-threaded periphery of comparatively large diameter, a grease duct extending through said projection to a point in front of said plunger in said bore, and a comparatively shallow grease cup having interior screw-threads adapted to operatively engage said screw-threaded periphery, substantially as described.

2. A grease gun, comprising: a barrel having a bore and a plunger adapted to be reciprocated therein, an integral projection of comparatively small cross-sectional area extending a considerable distance on one side of said barrel and having a flared end portion terminating in a circular flange which is provided with a screw-threaded periphery of comparatively large diameter, a grease duct extending through said projection to a point in front of the plunger in said bore, a comparatively shallow grease cup having interior screw-threads adapted to operatively engage said screw-threaded periphery, and integral finger-grip projections extending on opposite sides of said barrel at the point of axial intersection of said barrel and said circular flange and disposed in a plane parallel to said flange, substantially as described.

3. A grease gun, comprising: a barrel having a bore and a plunger adapted to be reciprocated therein, an intermediate projection extending a considerable distance on one side of said barrel and terminating in a circular flange of comparatively large diameter, a grease duct extending through said projection to a point in front of the plunger in said bore, a comparatively shallow grease cup provided with screw-threaded means for telescoping said flange and said grease cup, and intermediate finger-grip projections extending on opposite sides of said barrel and disposed in a plane parallel to said circular flange, substantially as described.

In witness whereof, I have hereunto set my hand this 24th day of July, 1929.

AXEL M. WALSTROM.